United States Patent
Sullivan

(10) Patent No.: US 7,451,222 B2
(45) Date of Patent: Nov. 11, 2008

(54) CLIENT-CENTERED WEP SETTINGS ON A LAN

(75) Inventor: Gary E. Sullivan, Trabuco Canyon, CA (US)

(73) Assignee: Gateway Inc., Irvine, CA (US)

( * ) Notice: Subject to any disclaimer, the term of this patent is extended or adjusted under 35 U.S.C. 154(b) by 1352 days.

(21) Appl. No.: 10/131,692

(22) Filed: Apr. 24, 2002

(65) Prior Publication Data
US 2003/0154287 A1  Aug. 14, 2003

Related U.S. Application Data

(60) Provisional application No. 60/356,480, filed on Feb. 13, 2002.

(51) Int. Cl.
*G06F 15/16* (2006.01)
(52) U.S. Cl. .................. 709/227; 709/220; 709/221; 709/225; 709/249; 713/153
(58) Field of Classification Search ............... 709/220, 709/225, 227; 713/200; 725/74; 370/352
See application file for complete search history.

(56) References Cited

U.S. PATENT DOCUMENTS

| 6,041,347 | A | 3/2000 | Harsham et al. |
| 6,105,100 | A | 8/2000 | Dean et al. |
| 6,243,747 | B1 | 6/2001 | Lewis et al. |
| 6,295,556 | B1 | 9/2001 | Falcon et al. |
| 6,307,842 | B1 | 10/2001 | Nakata et al. |
| 6,308,178 | B1 | 10/2001 | Chang et al. |
| 6,526,581 | B1 * | 2/2003 | Edson .................... 725/74 |
| 2002/0007407 | A1 * | 1/2002 | Klein .................... 709/225 |
| 2002/0065941 | A1 * | 5/2002 | Kaan et al. ............. 709/249 |
| 2002/0141385 | A1 * | 10/2002 | Wasik et al. ........... 370/352 |
| 2003/0041175 | A2 * | 2/2003 | Singhal et al. ......... 709/249 |
| 2003/0069947 | A1 * | 4/2003 | Lipinski ................ 709/220 |
| 2003/0070084 | A1 * | 4/2003 | Satomaa et al. ........ 713/200 |

OTHER PUBLICATIONS

SpectrumSoft WNMS Wireless Network Management System, XP-002252966, Dec. 1998.
SpectrumSoft WNMS Wireless Network Management System, XP-002252967, Jun. 2000.
Wireless Security and VPN—Intel.
3Com Home Wireless Gateway.
3Com IEEE 802.11b Wireless LANs.
ORiNOCO—ORiNOCO CL (Client) Manager http://www.wavelan.com/template.html?section=m57&page=106&envelope=93.
Intel Network Connectivity Nov. 6, 2001, Intel Wireless Gateway.
Linksys WAP11—Instant Wireless Network Access Point.
Linksys WUSB11—Instant Wireless USB Network Adapter.
3Com Home Wireless Gateway Nov. 6, 2001.

* cited by examiner

*Primary Examiner*—Yves Dalencourt
(74) *Attorney, Agent, or Firm*—Scott Charles Richardson; The Brevetto Law Group, PLLC

(57) ABSTRACT

A method of integrating setting up a residential gateway or access point and setting up a client network adapter into a single software process. The method eliminates inconsistent and confusing terminology and methods of interfacing different client adapter setups with different residential gateways and access points by using a common user interface.

17 Claims, 17 Drawing Sheets

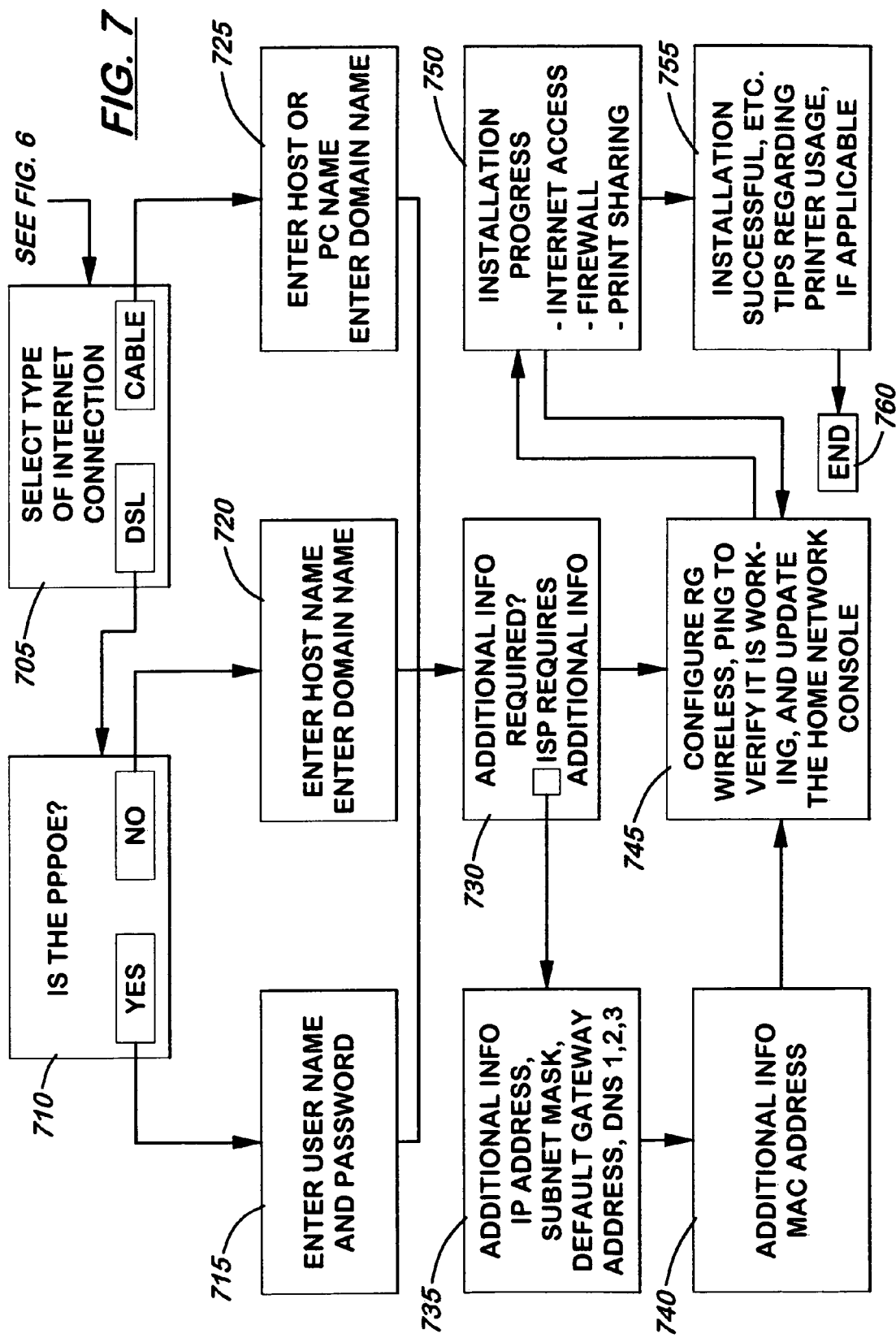

CLIENT-CENTERED WEP SETTINGS ON A LAN

CROSS REFERENCE TO RELATED APPLICATIONS

This application claims priority from provisional patent application Ser. No. 60/356,480, filed Feb. 13, 2002, herein incorporated by reference in the entirety.

FIELD OF THE INVENTION

This invention generally relates to software integration, and specifically, to a method for integrating a client network adapter setup with a residential gateway or access point setup.

BACKGROUND OF THE INVENTION

Certain descriptions of the terminology used in the application are given. A gateway is a communications device which manages the flow of information between two networks. A wireless gateway is a device that connects broadband access to a local wireless network. A network adapter (also called a network interface card or NIC) is typically installed within a slot of the PC to connect the PC with a local area network. An access point, the wireless equivalent of a hub, is a means of entry into a controlled security area, consisting of a card reader, monitor switches and/or latches and is wired to an access control panel. WEP is wired equivalent privacy encryption based on the RC4 encryption algorithm.

Currently, wireless configuration changes, including specifying different profiles, network names, and encryption settings, are performed on a PC-by-PC basis. To further complicate matters for the user, if an access point or wireless residential gateway is used, its settings must stay in sync with that of wireless clients, otherwise the clients will be cut off from the network. If the customer is connected wirelessly to the access point, and opens the access point's user interface and changes the settings, he is at that point in time cut off from the access point and the rest of the network. If he cannot subsequently make the same changes on his client (perhaps he forgot to write down the encryption key) he is out of luck, and must reset the access point. If the access point is in a router, the hardware reset will reset everything, including his WAN settings, so his Internet access is lost. Another problem with this situation is that often the user interfaces among different client adapter setups and different access points and residential gateways use inconsistent methods and terminology, i.e., "SSID"(service set identifier), "ESSID", and "Network name" are all names for the same thing, and must be set to the same text on each device.

Therefore, a method and apparatus for integrating a client network adapter setup with a residential gateway or access point setup, so the customer only deals with a single user interface that accepts encryption and network name information is needed.

SUMMARY OF THE INVENTION

The present invention provides a method for integrating a client network adapter setup with a residential gateway or access point setup, so the customer only deals with a single user interface that accepts encryption and network name information, then programs both the client network adapter and the RG or access point. The programming action may be a single, self-synchronized algorithm that first programs the RG or access point, then programs the client adapter, then checks to make sure that the connection has been maintained.

In a first aspect of the present invention, a method is disclosed for changing configurations having the steps of programming a residential gateway or access point and programming a client network adapter which corresponds to the residential gateway or access point. The setting up of the client network adapter and the setting up of the residential gateway or access point is performed through a single software program.

In a second aspect of the present invention, a computer program of instructions is disclosed which includes code for setting up a residential gateway or access point and code for setting up a client network adapter which corresponds to the residential gateway or access point. The code for setting up the residential gateway or access point and the code for setting up the client network adapter is a single integrated program.

In a third aspect of the invention, a method is disclosed for facilitating setting up a computer to a network which includes the steps of setting up components internal to the computer and setting up components external to the computer in which the method is performed through a single integrated software program. The internal components include a network adapter and the external components include a residential gateway or an access point. Alternatively, the internal components include a network interface component and the external components include a network connection component. A single user interface is used for implementing the method.

The present invention integrates the client network adapter setup with the residential gateway or access point setup, so the customer only deals with a single user interface that accepts encryption and network name information, then programs both the client network adapter and the residential gateway (RG) or access point.

An advantage of the present invention is that the customer does not need to be aware of the existence of the access point, or that there is a synchronization requirement, and that he only has to type the information once rather than twice. If a common user interface is used on all client devices, then there is never inconsistent terminology or methods.

An advantage of the present invention is that if a customer has a wireless RG, but no wireless client adapters, he need not be bothered at all with the encryption settings. These only need to be applied (and encryption, or even the RG's radio itself enabled) once a wireless device is introduced.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 7 illustrates a further aspect of a thin RG setup flow of the present invention;

DETAILED DESCRIPTION OF THE INVENTION

Figure 1:
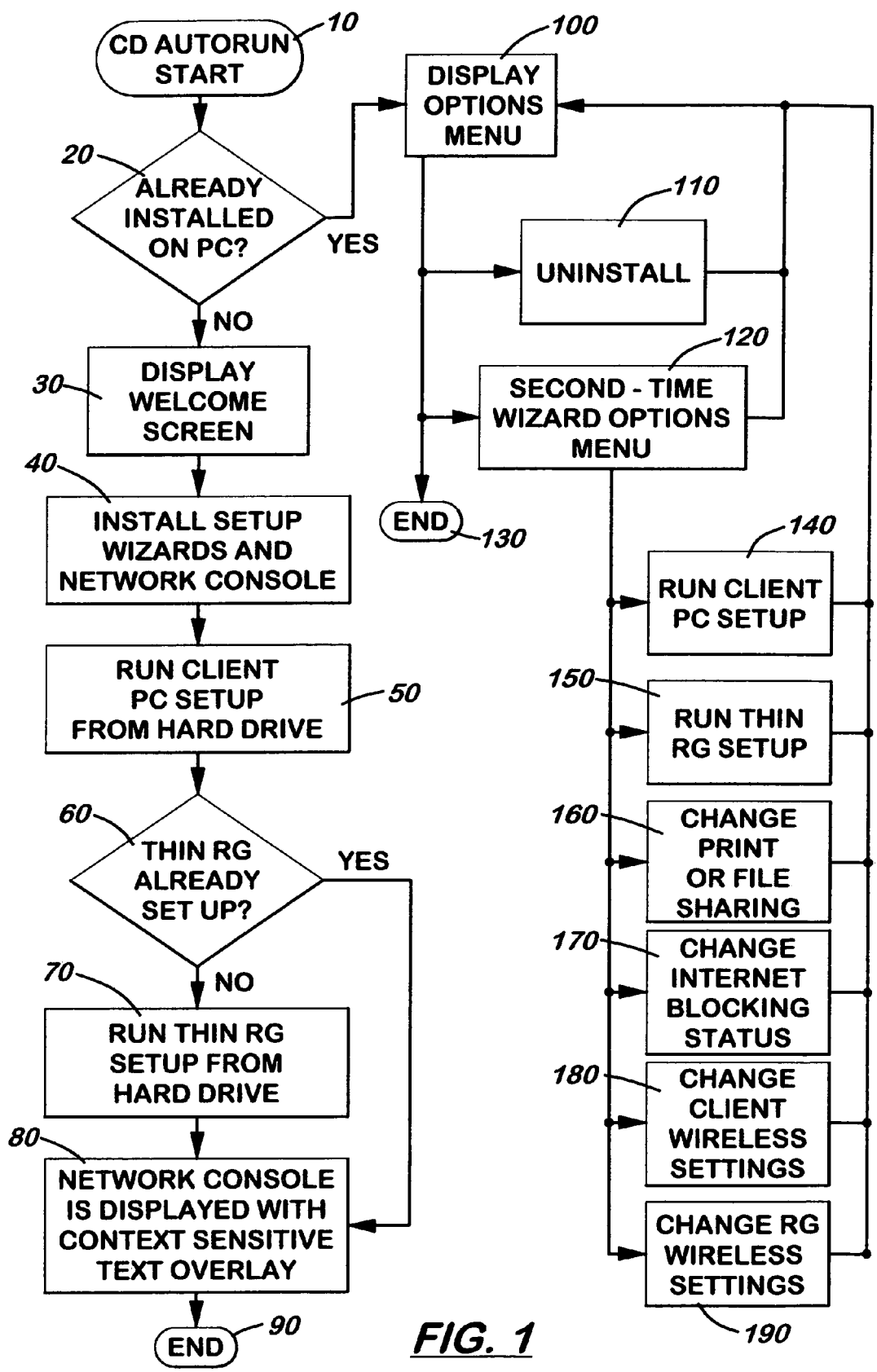
FIG. 1 illustrates a flow chart of the method steps found in the present invention.

Reference will now be made in detail to the presently preferred embodiments of the invention, examples of which are illustrated in the accompanying drawings.

Referring generally now to FIGS. 1 through 12, exemplary embodiments of the present invention are shown The present invention integrates the client network adapter setup with the residential gateway or access point setup, so the customer only deals with a single user interface that accepts encryption and network name information, then programs both the client network adapter and the residential gateway (RG) or access point. The programming action may be a single, self-synchronized algorithm that first programs the RG or access point, then programs the client adapter, then checks to make sure that the connection has been maintained. Instead of a residential gateway, any common network node may be used, such as a server, a router, a bridge, a brouter, or a network PC.

In one embodiment, the action must always start from a working connection. The client software must know the out-of-box default settings for the RG or access point (often, it is "encryption disabled"). If the customer provides an encryption key before the RG has been initially set up, it configures itself to match the RG's out-of-box default, connects, reprograms the RG and then itself, and checks its connection. If the RG has already been setup from another wireless client, the user types the encryption information. The software finds that it cannot connect with the "out-of-box" default, so it tries the encryption code supplied by the user. Assuming the user correctly typed the same encryption code, the client will be able to connect and everything is okay.

The client network adapter setup may be implemented through a client PC setup wizard which automates basic network configuration on existing PCs. The client PC setup wizard may be bundled with an external wireless networking kit or with add on PCs having internal network adapters. The client PC setup wizard may ensure that the driver for the NIC (internal network adapter) is installed and configured, the network stack configured, and file and print sharing enabled, and wireless network security is configured with the absolute minimum user interface possible. In addition to setting up basic networking, the client PC setup wizard may launch the installation program for a network console which provides instant visual feedback as the client PC setup wizard enables each networked PC. The network console provides a graphical representation of a home network, displaying images of all supported devices and peripherals on the network.

The residential gateway setup wizard simplifies the initial configuration of a thin residential gateway. Unlike methods found in the prior art, the residential gateway setup wizard of the present invention makes the process simpler, removes the risk of user pilot errors, and guarantees that all users configure the device the same way. The residential gateway setup wizard may define and enforce a defined default network configuration that is safe and simple for the customer and that will support add on features that may be transparent to the user. It may limit user options to what is only absolutely necessary and minimal. It may combine all required options into a sequence of residential gateway setup wizard pages having one or two simple options per page, eliminating the need to navigate individual pages on the web interface. The residential gateway setup wizard may also confirm correct operation, utilize internal functions of the RG to diagnose problems, suggest solutions, and direct customers to appropriate user assistance resources.

Certain assumptions may be made regarding the hardware and software. There is a minimum of one client PC and a thin residential gateway that provides access to a network such as the Internet. The client setup wizard may configure networking on all added PCs to the network and support legacy PCs such as with a networking kit (e.g., USB wireless). The client setup wizard may assume that the residential gateway is a thin RG or an XP-based RG PC. Various peripheral devices may be networked directly or may be connected to the client PC. As for software, the client PCs may use an operation system such as Windows, including Windows 98, 98SE, ME, 2000, and XP. An AOL client may be installed on one or more client PCs.

The present invention may be implemented through a single CD which contains a single installation program that installs both the setup wizards and the network console. The integrated software program may reside in its entirety on the PC.

In the case where there are two or more network adapters present, the setup wizards determines which adapter is attached to an ICS host. If the setup wizards cannot make the determination, the user will be queried for his choice of network adapter.

The user may connect the RG and wire the network prior to running a setup wizard. Each sequential screen may present only a single question or parameter setting or a very small set of closely related settings. After networking is enabled, the network console is automatically installed. If the software detects that a thin RG is present, and that it has not been configured, the thin RG setup wizard is automatically run or an option menu appears before the user.

Client PCs may have certain functional requirements. A driver for the supported network adapter may be installed.

TCP/IP networking is installed, enabled, and tested for the network adapter. The client for networking is installed and enabled. File sharing is installed and enabled (such as Windows). Print sharing is installed and enabled and the user's printer is shared. A web connection sharing client capability is enabled. If the client connection is wireless, the wireless device is configured for secure access. Other client related software is installed. The user has assigned the BIOS or NETBIOS name and descriptive name. The user has specified whether web access is to be blocked for the client PC. A diagnostic has confirmed that the client installation has been successful and that the residential gateway is present.

The thin residential gateway may have certain function requirements. In one embodiment, the user must be able to configure the thin RG from a wireless client PC, the thin RG setup wizard must verify that it is communicating with the correct model and version of the thin RG before it attempts to configure it, each screen that displays user options must display the state of those options as currently configured on the thin RG not default values, and the user cannot run the thin RG setup wizard on a client PC unless the client PC setup wizard has successfully completed its client PC installation and setup on that PC.

Generally, the following function requirements are found. The WAN access is configured and is working. Print sharing is configured and enabled. The thin RG device's local IP address has been pre-assigned. The DHCP server is configured and enabled. The firewall is configured and enabled. The thin RG's security password is assigned. The thin RG's wireless access point is configured for secure access.

FIG. 1 illustrates an exemplary embodiment of the method steps of a single integrated software process of the present invention. In one embodiment, the single software process installs both setup wizards and the network console. A standard operating system installation process may be used to install the setup wizards and the network console before execution of the setup wizards. An autorun process may define and control the sequencing during installation and configuration. The single software process may allow the user to see, and optionally modify, a single path specifying the location of the code for the setup wizards and the network console. The network console may be used as the launching point for rerunning the setup wizards from the hard drive.

A CD autorun starts the process, step 10. A determination is made by the PC as to whether the integrated software is installed on the PC, step 10. If it is not, a welcome screen is displayed, step 30, the setup wizards and network console are installed, step 40, and the client PC is run from the hard drive, step 50. A determination is then made as to whether the residential gateway has already been setup, step 60. If it has not, then the thin RG setup is run from the hard drive, step 70. Afterward, the network console is displayed with context sensitive text overlay, step 80. If the determination at step 60 is that the residential gateway has already been setup, step 80 is immediately performed. The setup process then stops.

If in step 20, it is determined that the setup wizards and the network console have already been installed on the PC, a display options menu appears, step 100. The user is given three options: exit the process in step 130, uninstall the setup wizards and network console in step 110, or install the wizards and network console. The wizard options menu permits running of the client PC setup in step 140, running the thin RG setup in step 150, changing print or file sharing in step 160, changing the Internet blocking status in step 170, changing the client wireless settings in step 180, and changing the RG wireless settings in step 190.

Figure 2A:
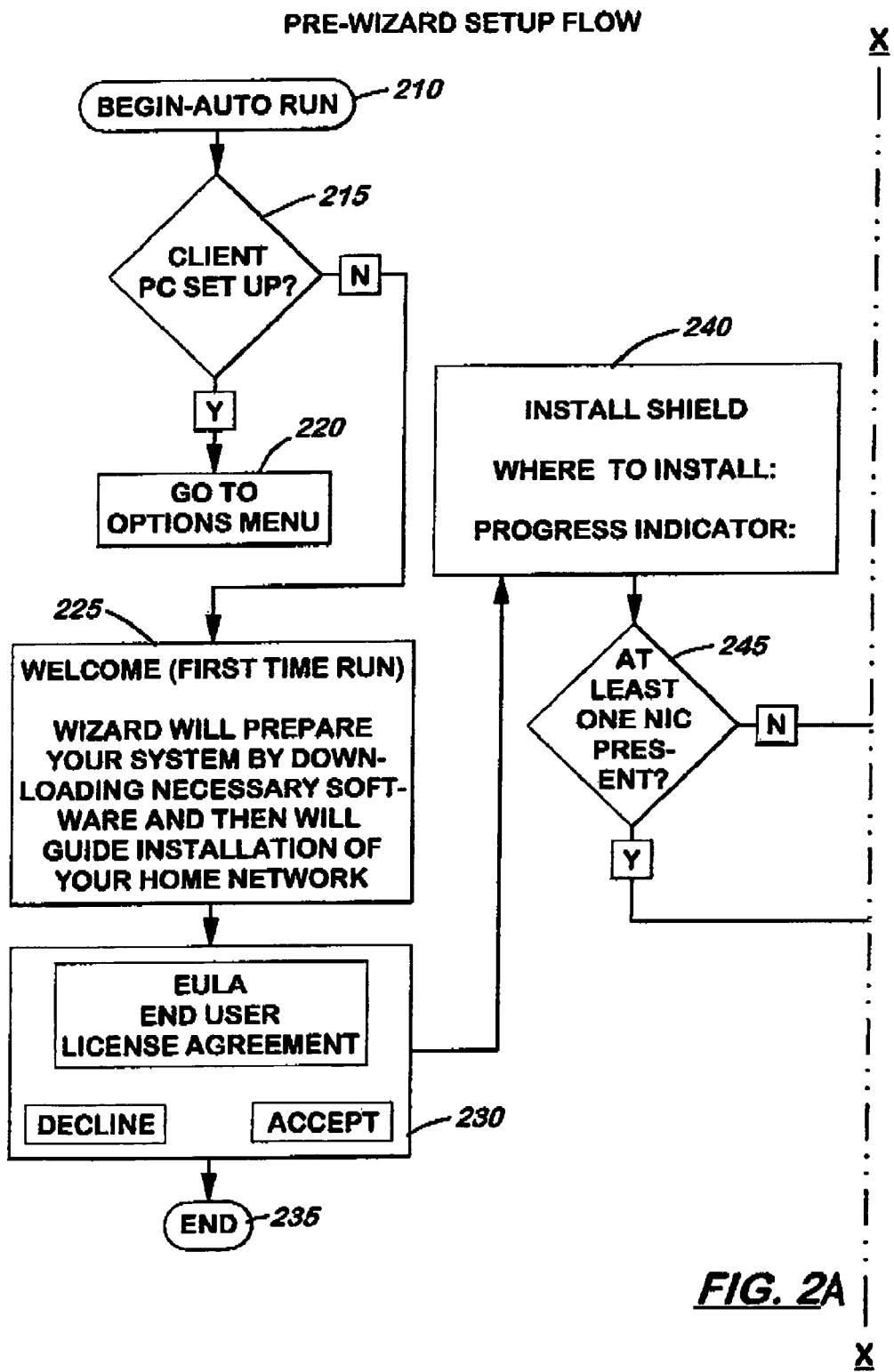
FIG. 2A illustrates a portion of a pre-wizard setup process of the present invention which is further illustrated in FIG. 2B.
Figure 2B:
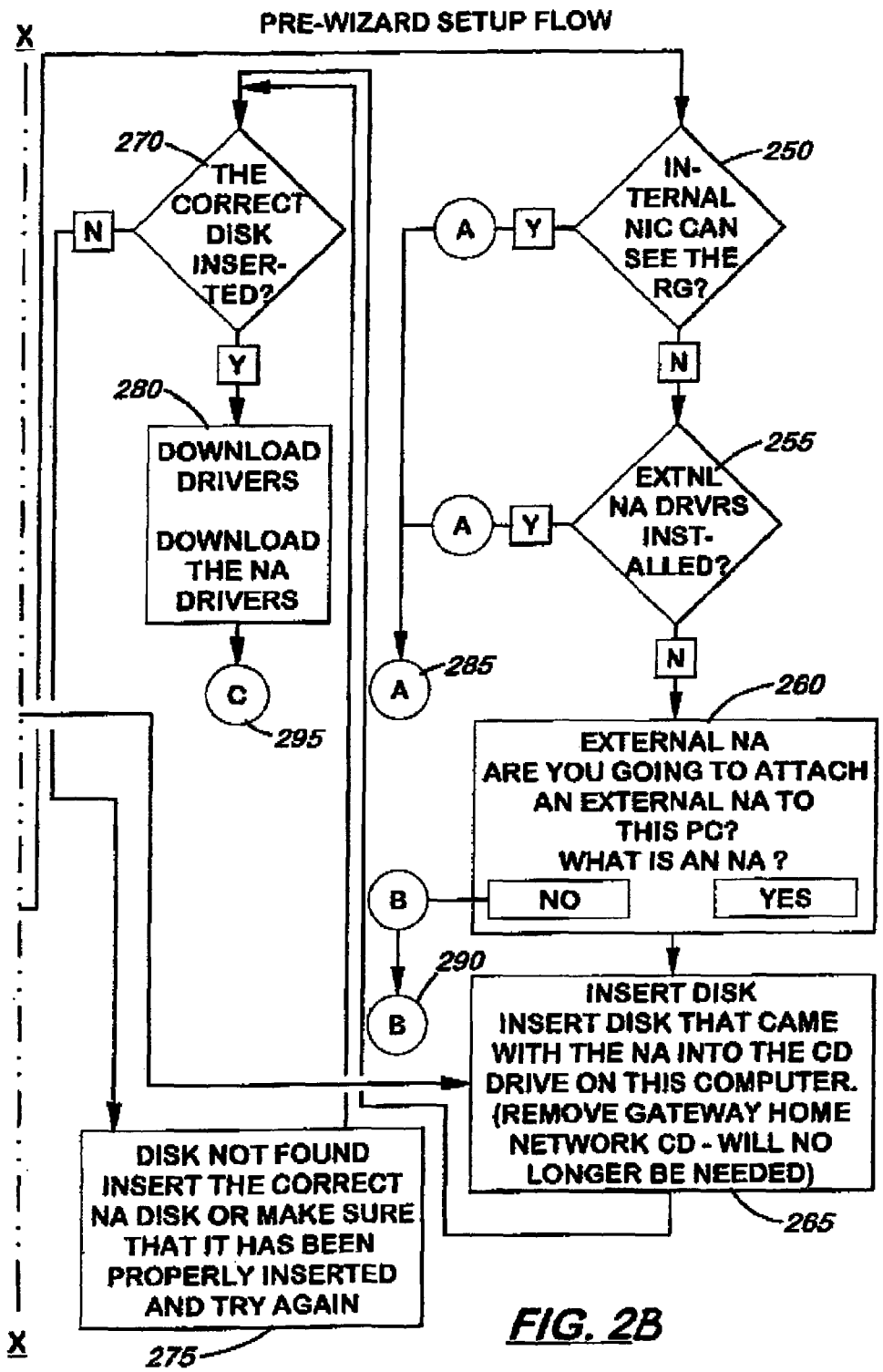
FIG. 2B illustrates a further portion of the pre-wizard setup process of the present invention which is illustrated in FIG. 2A.
Figure 3A:
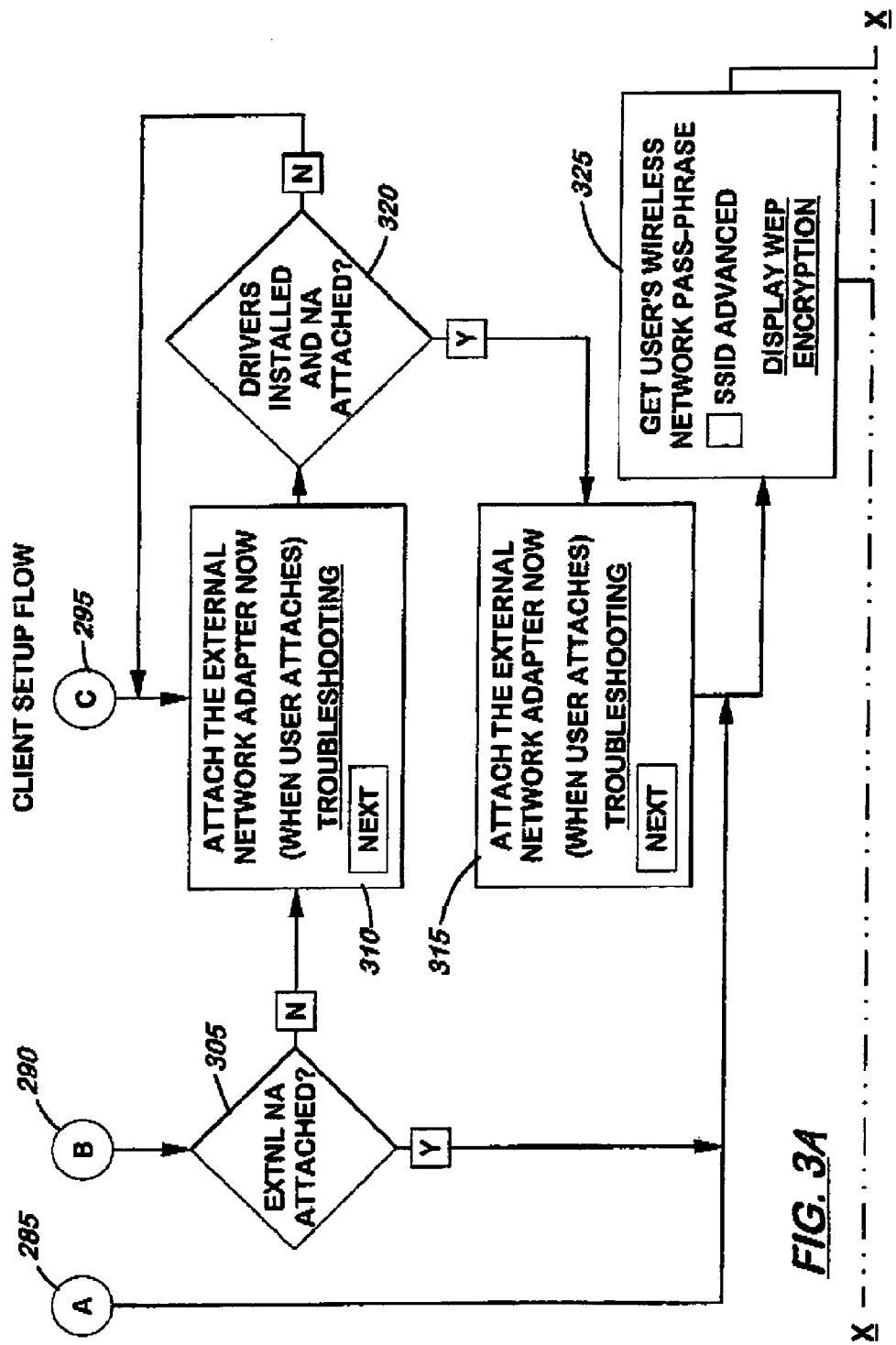
FIG. 3A illustrates a portion of a client setup process of the present invention which is further illustrated in FIG. 3B.
Figure 3B:
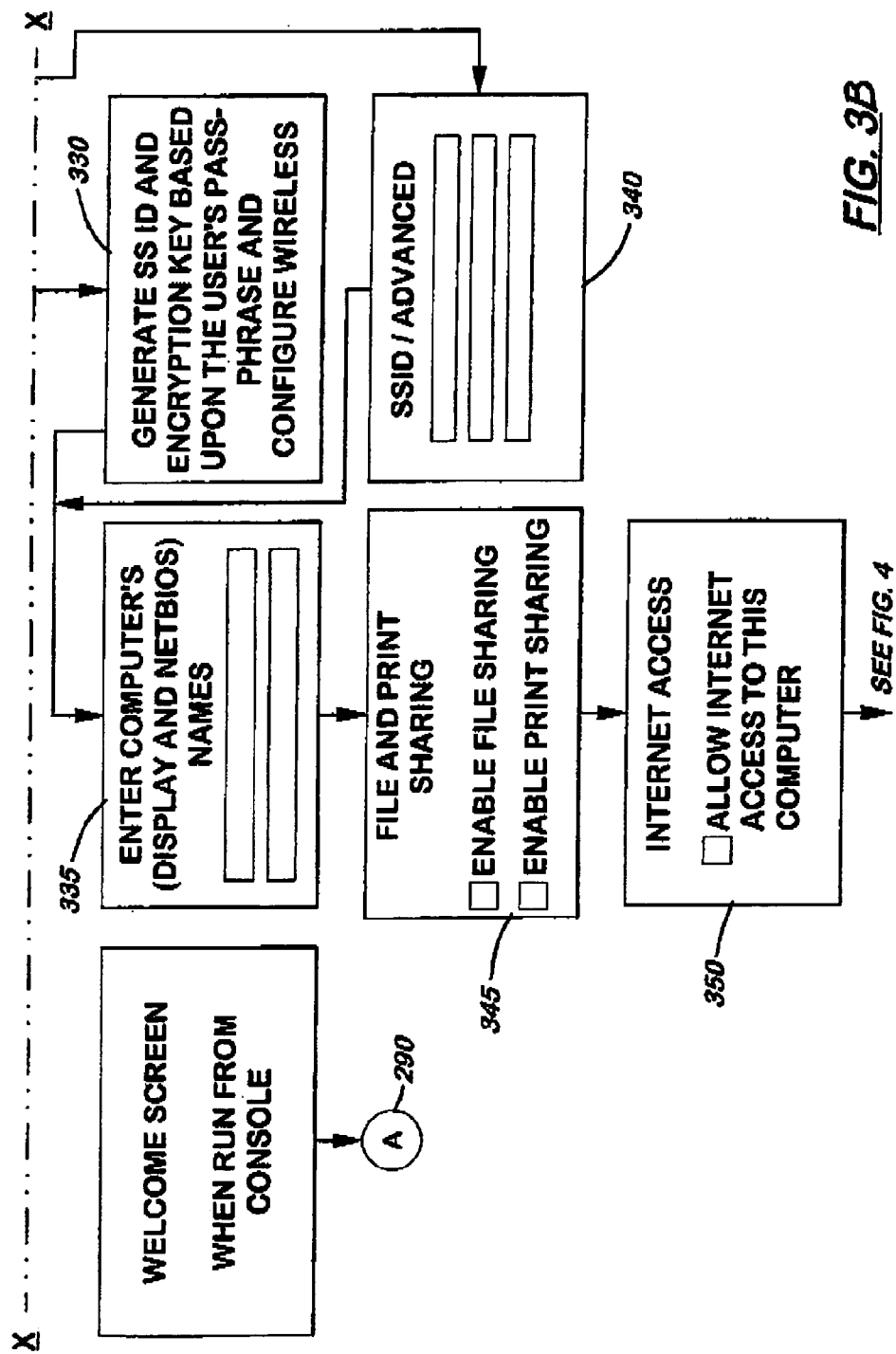
FIG. 3B illustrates a further portion of the client setup process of the present invention which is illustrated in FIG. 3A.
Figure 4:
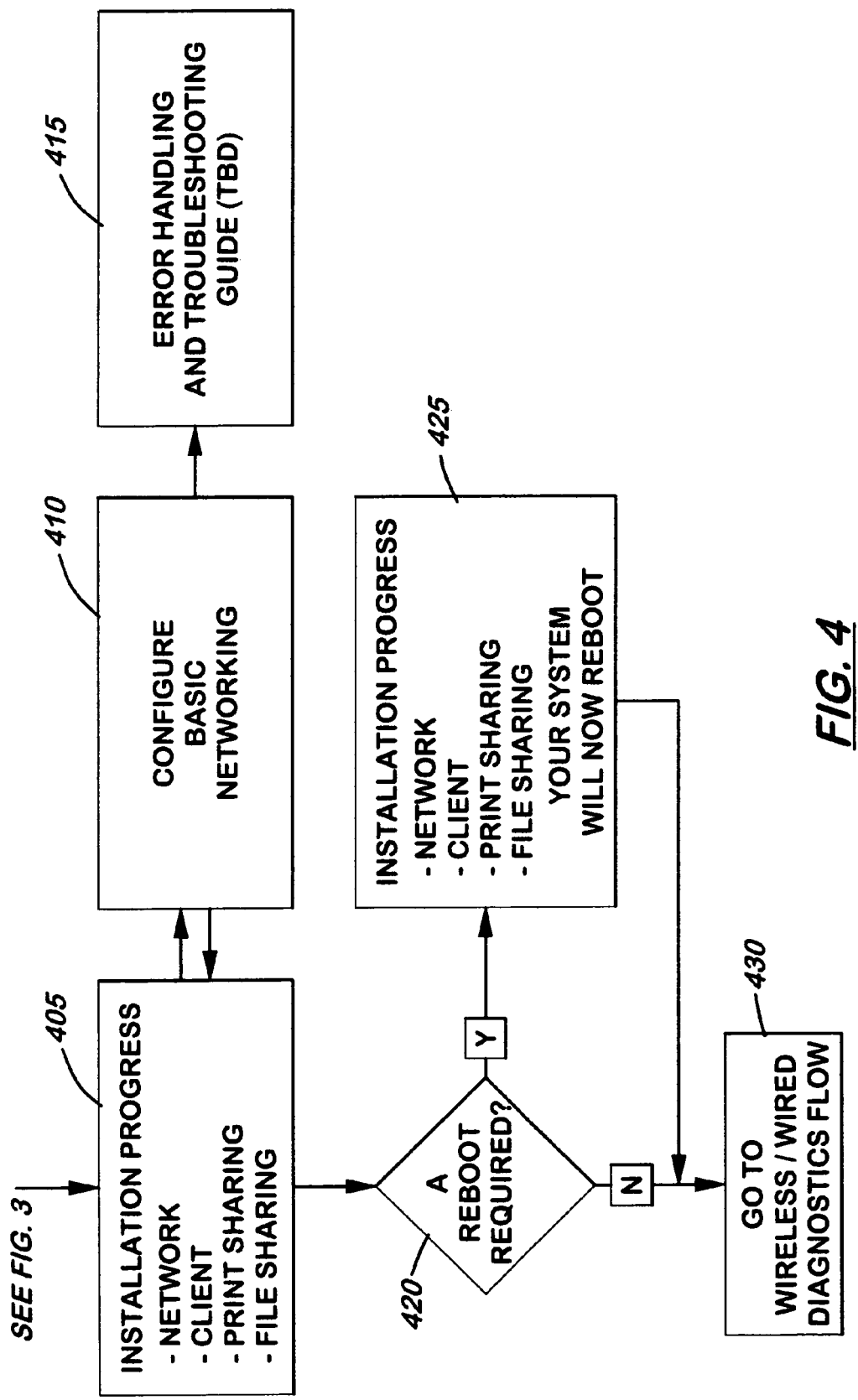
FIG. 4 illustrates a further aspect of a client setup process of the present invention.
Figure 5A:
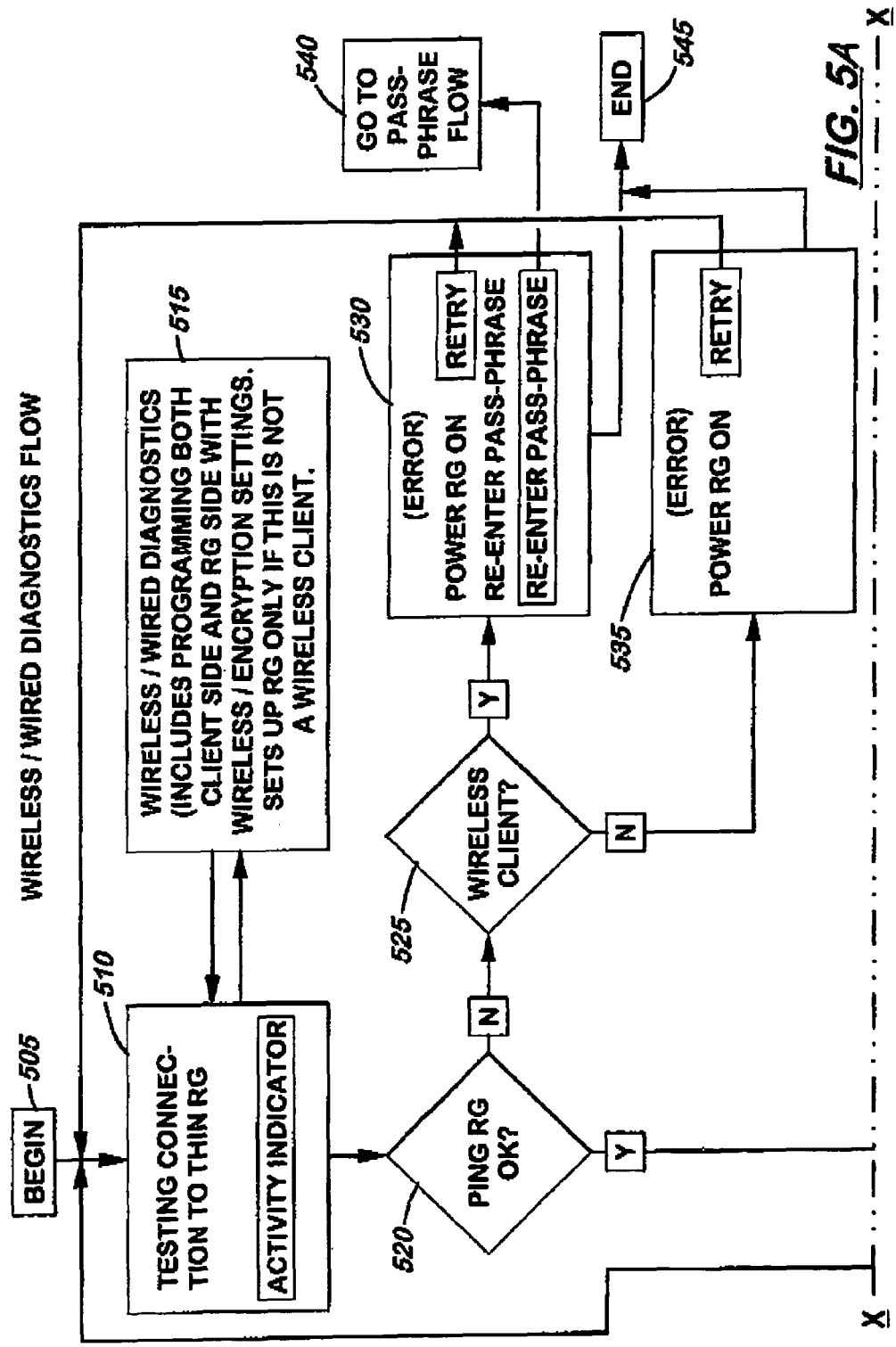
FIG. 5A illustrates a wireless/wired diagnostics flow of the present invention which is further illustrated in FIG. 5B.
Figure 5B:
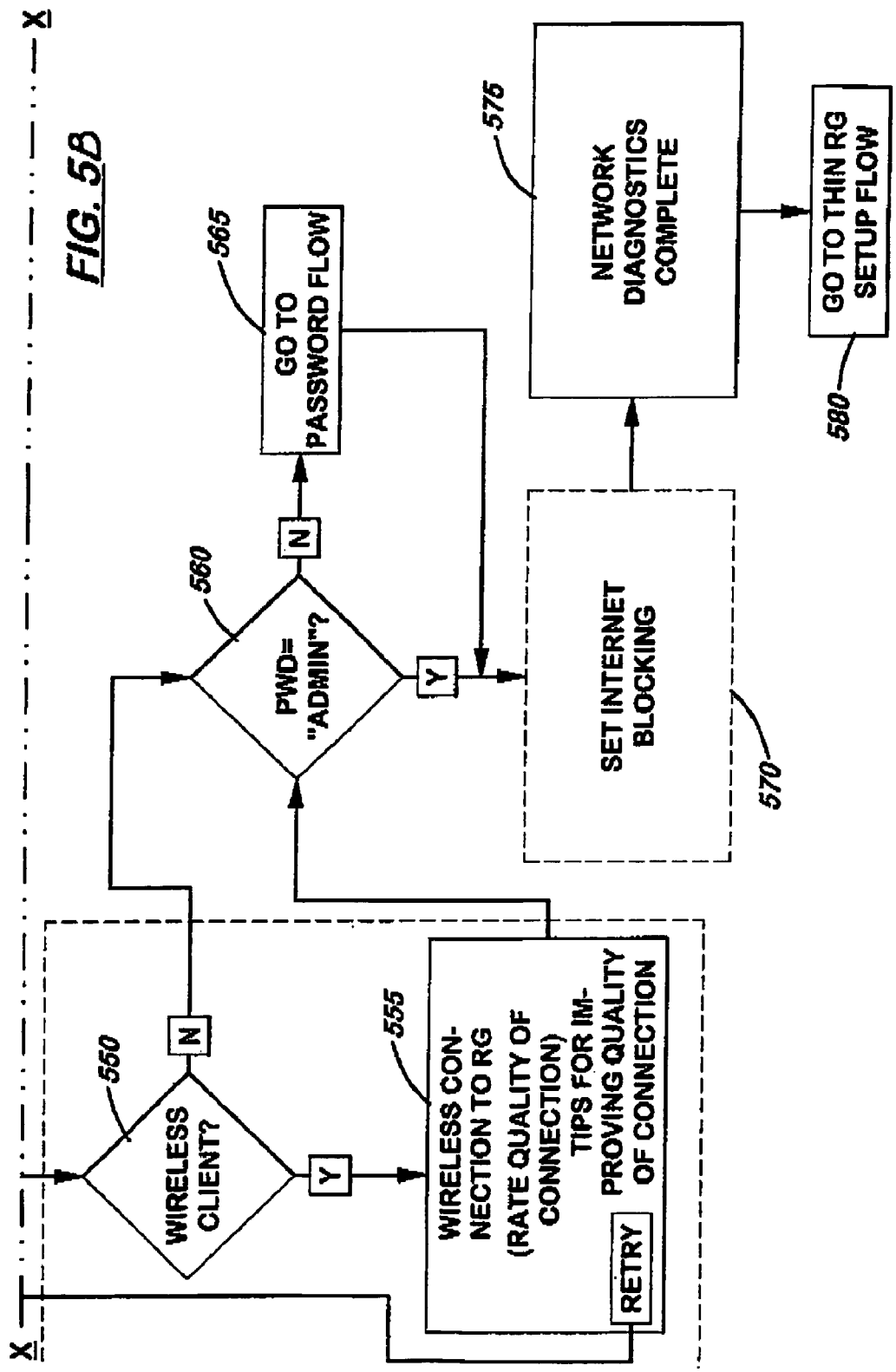
FIG. 5B illustrates a further portion of the wireless/wired diagnostics flow of the present invention which is illustrated in FIG. 5A.
Figure 6A:
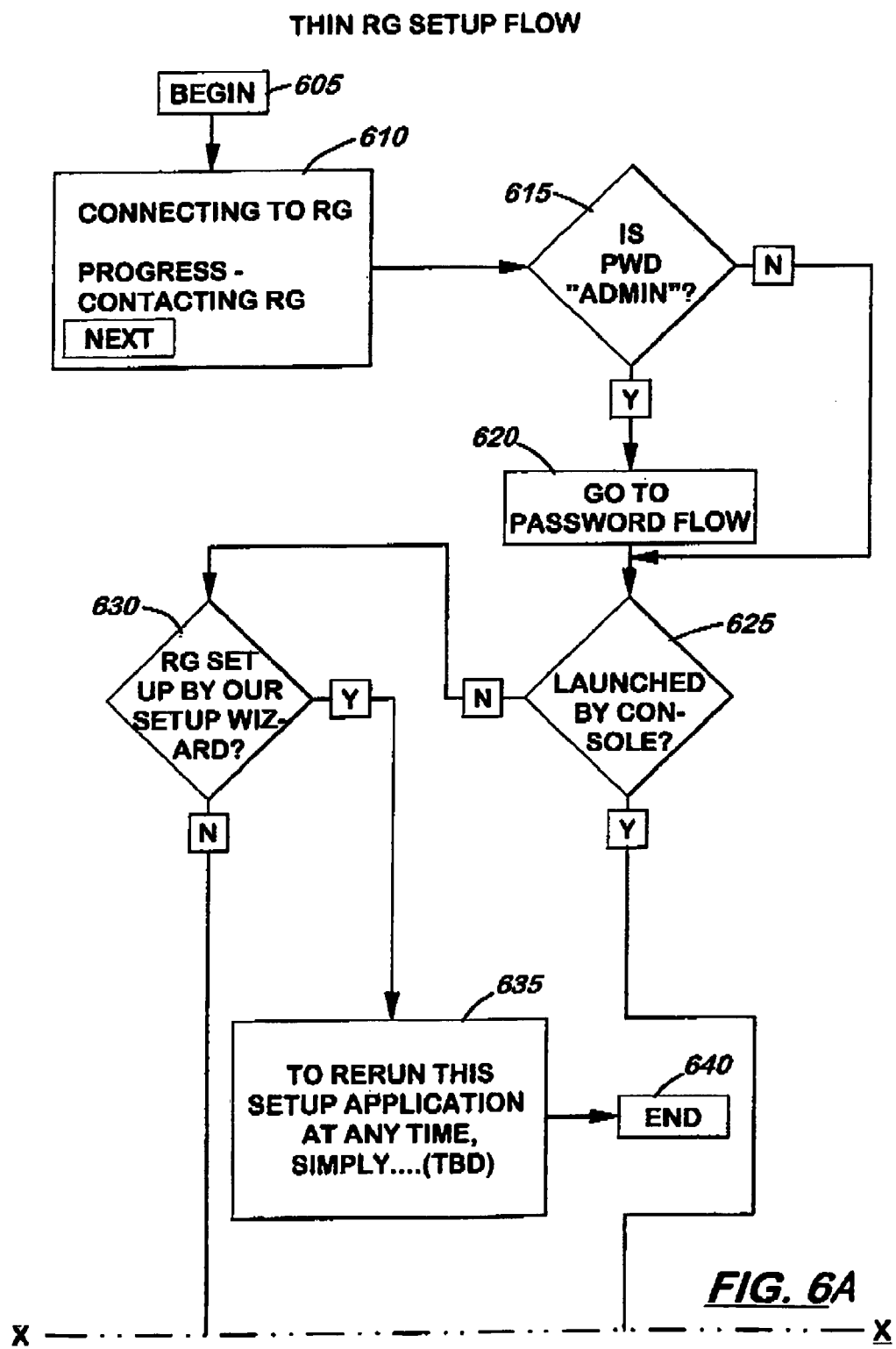
FIG. 6A illustrates a portion of a thin RG setup flow of the present invention which is further illustrated in FIG. 6B.
Figure 6B:
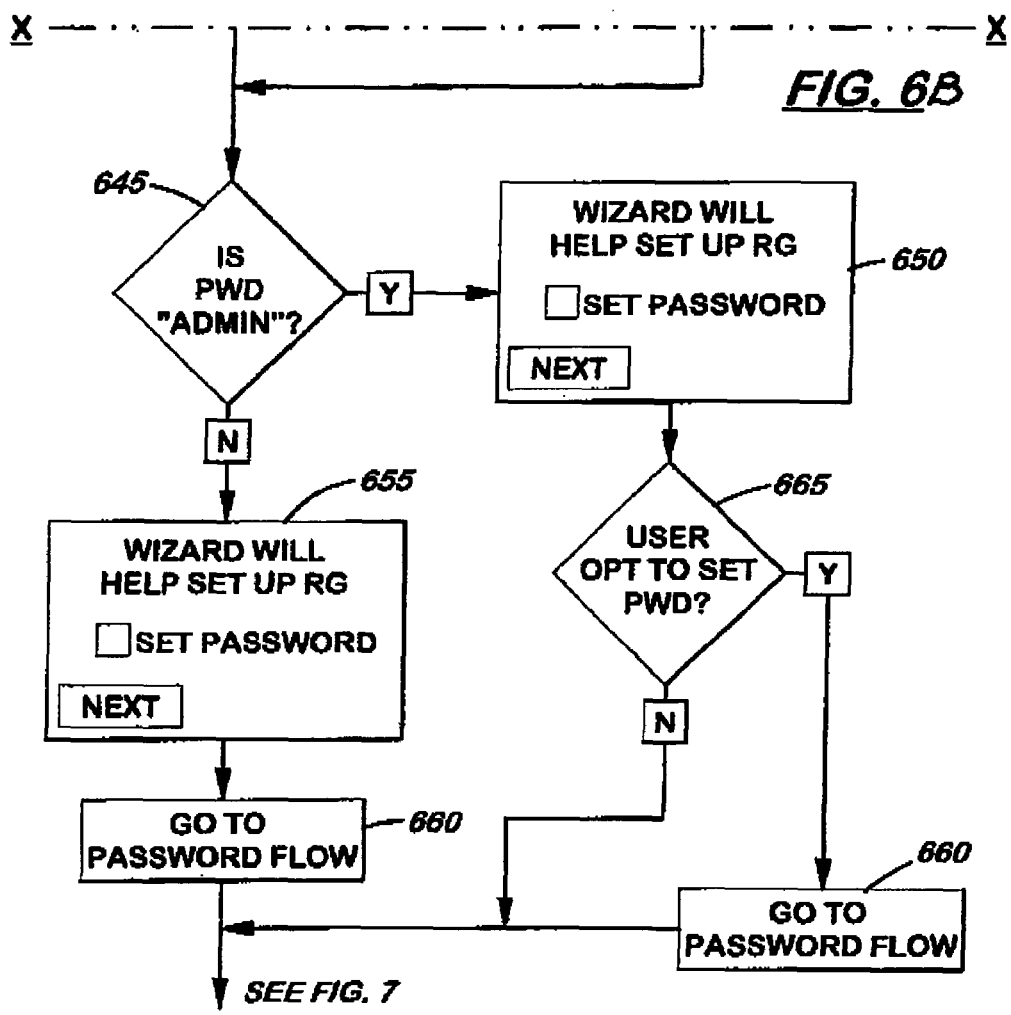
FIG. 6B illustrates a further portion of the thin RG setup of the present invention which is illustrated in FIG. 6A.
Figure 8:
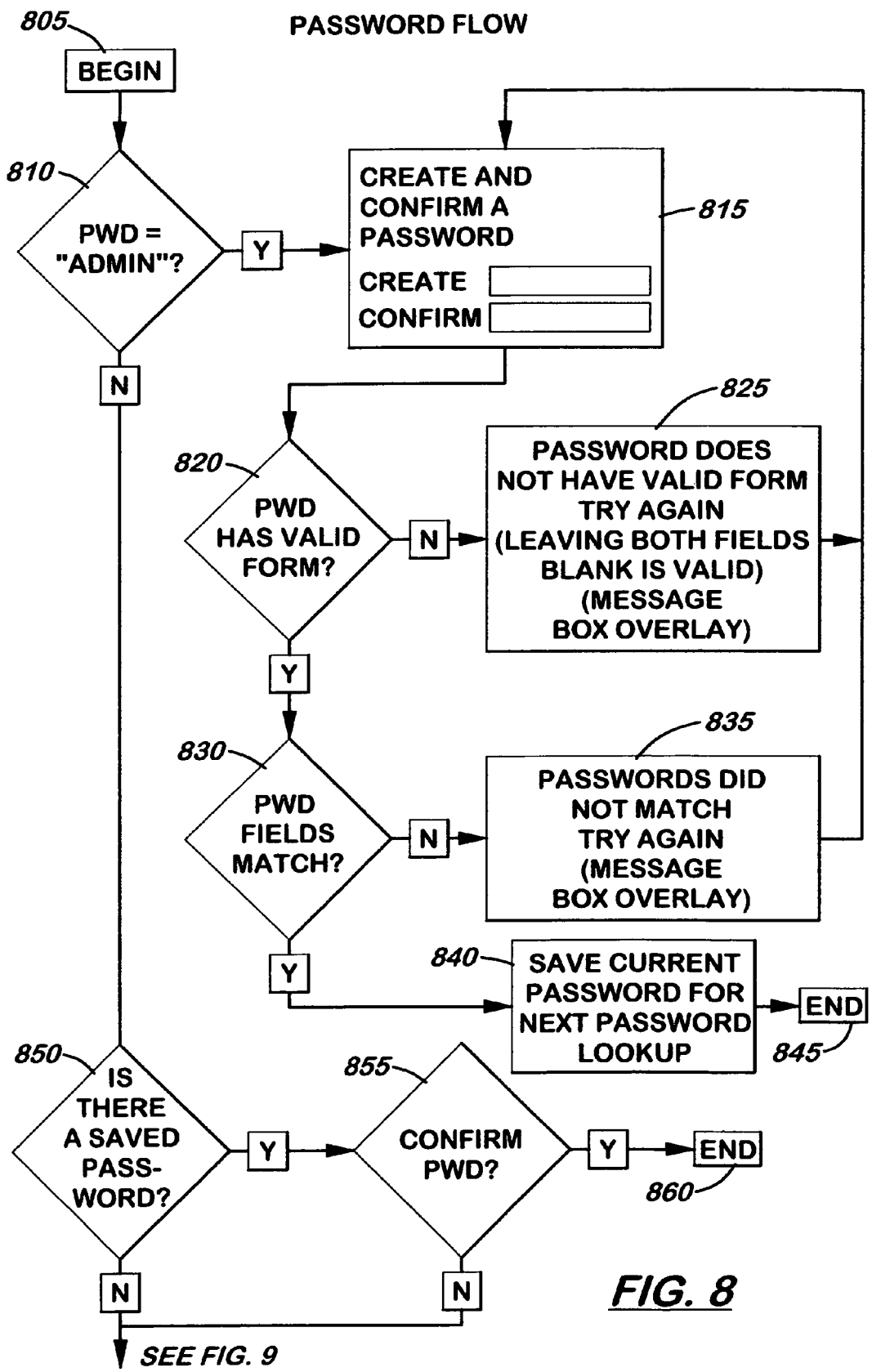
FIG. 8 illustrates one aspect of a password flow of the present invention.
Figure 9A:
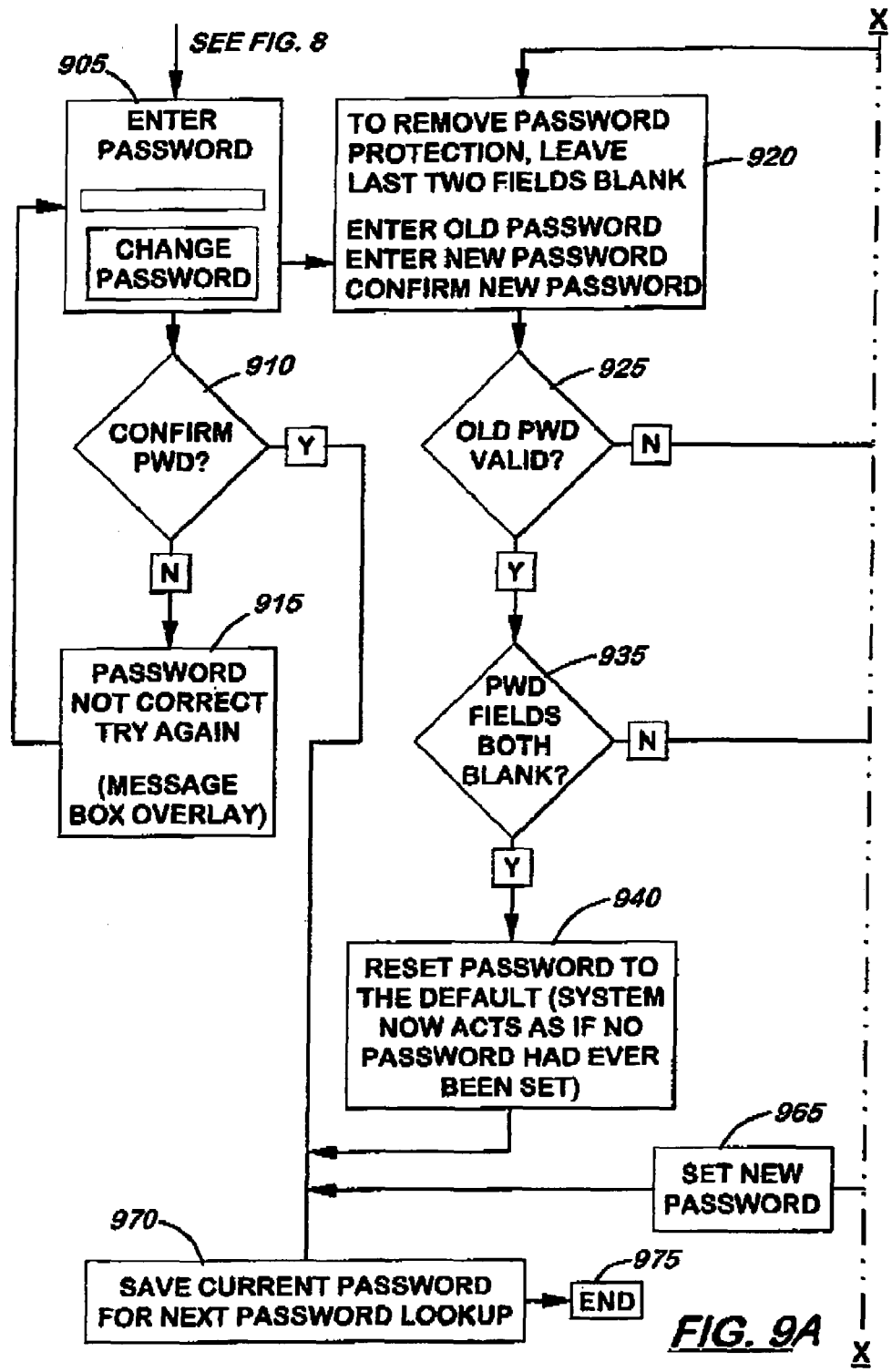
FIG. 9A illustrates a portion of a password flow of the present invention which is further illustrated in FIG. 9B.
Figure 9B:
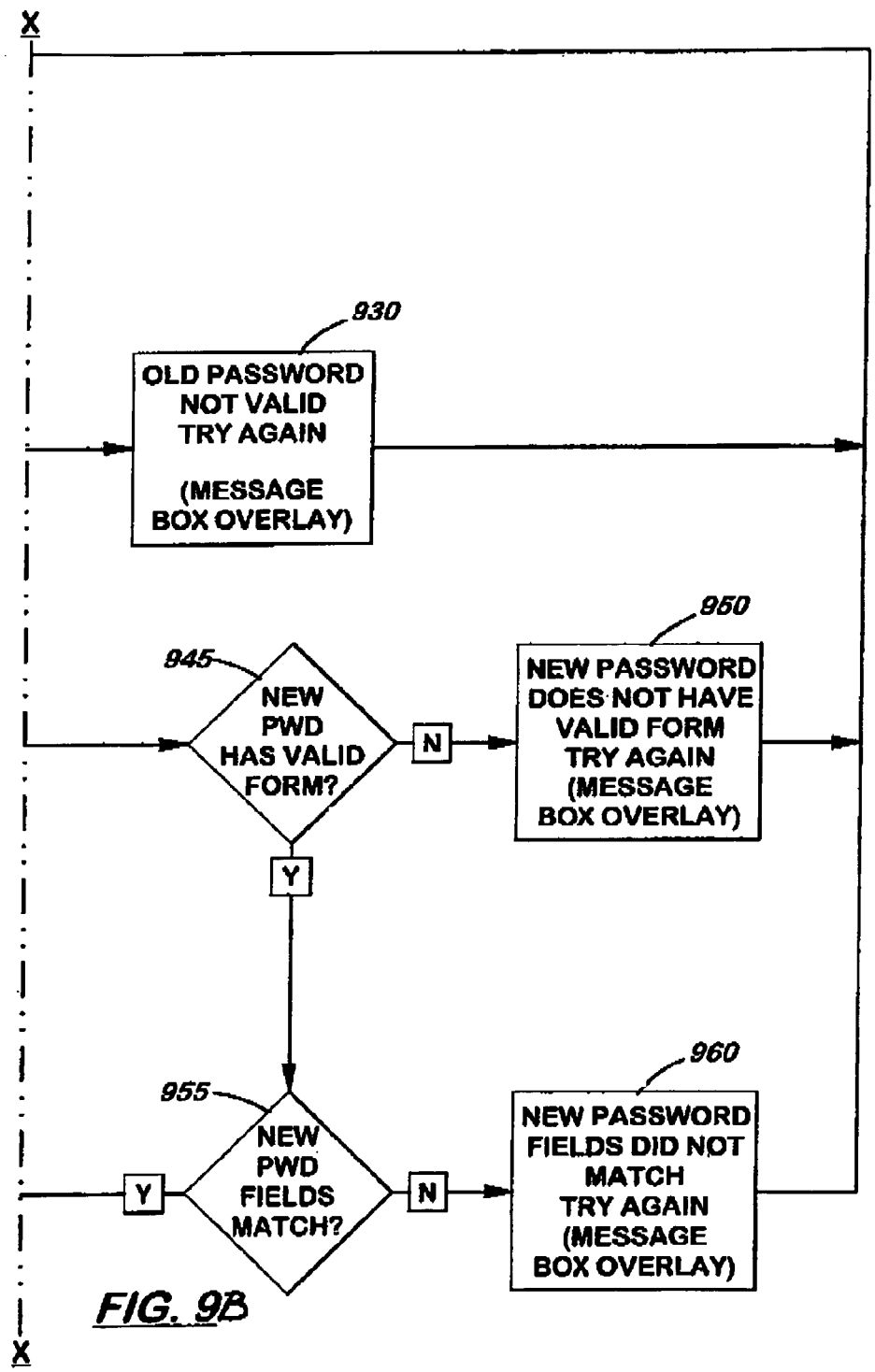
FIG. 9B illustrates a further portion of the password flow of the present invention which is illustrated in FIG. 9A.
Figure 10:
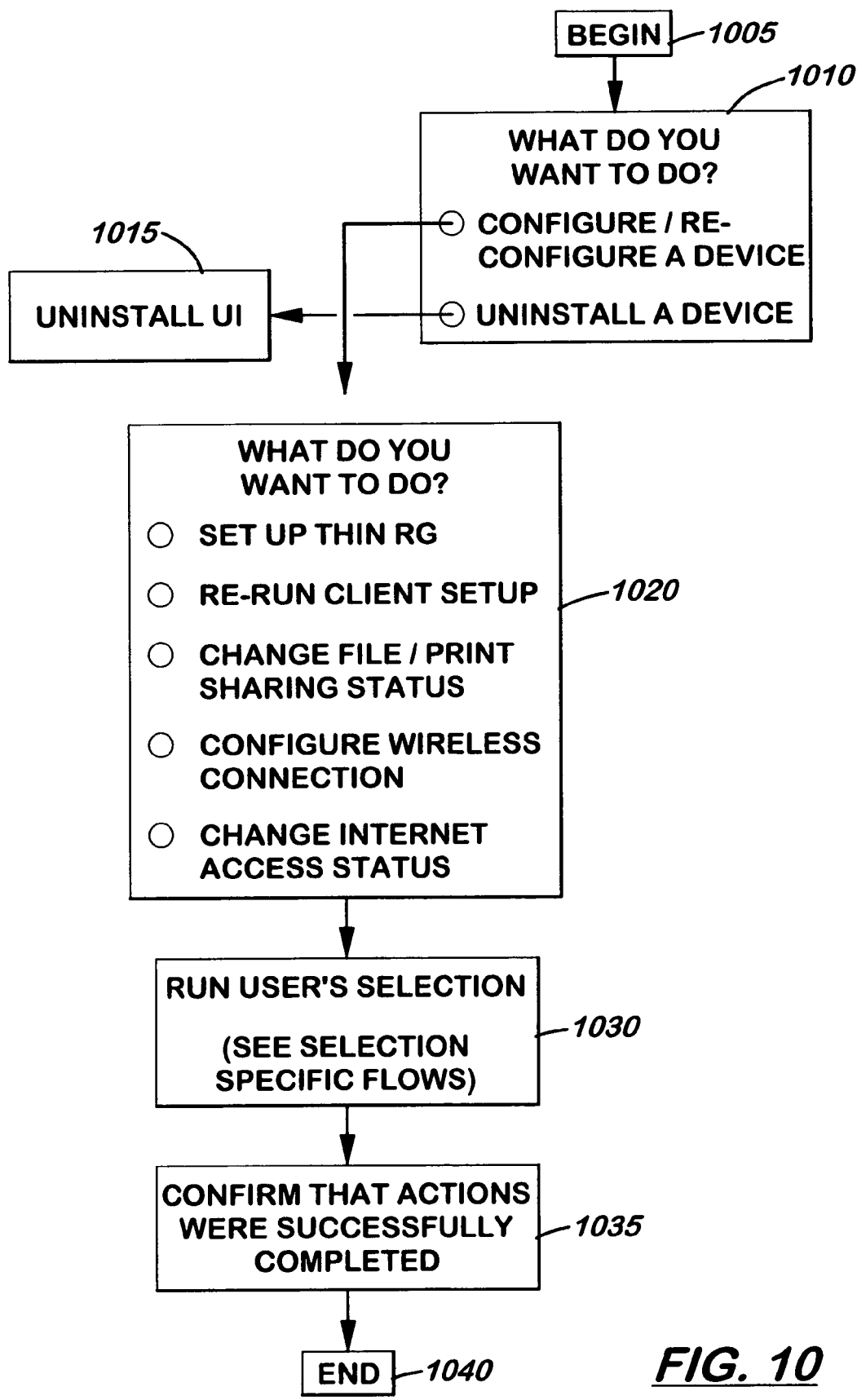
FIG. 10 illustrates an options menu flow of the present invention.
Figure 11A:
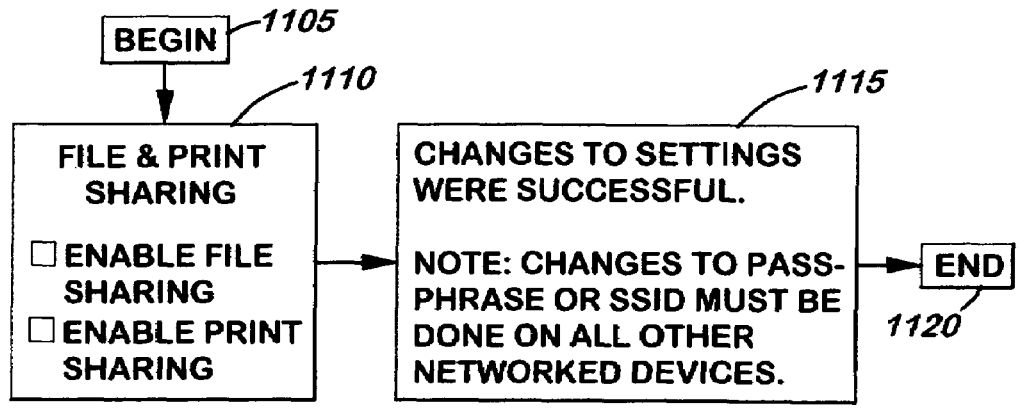
FIGS. 11A and 11B illustrate a change file/print sharing flow and a configure wireless connection flow of the present invention.
Figure 11B:
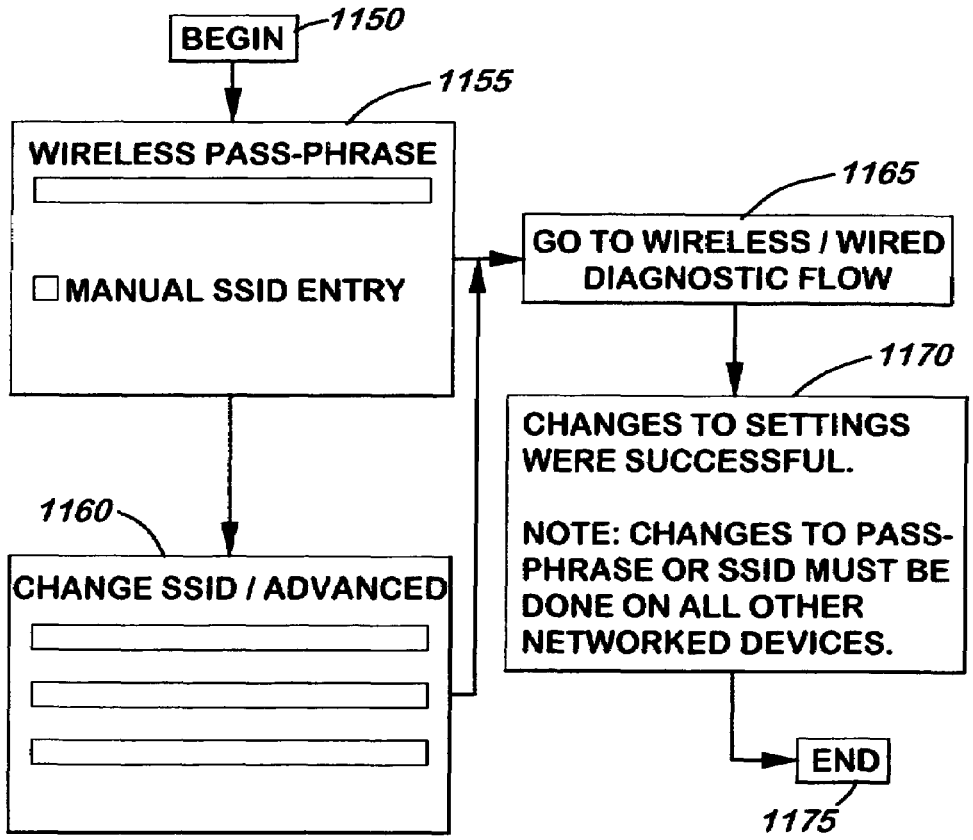
Figure 12:
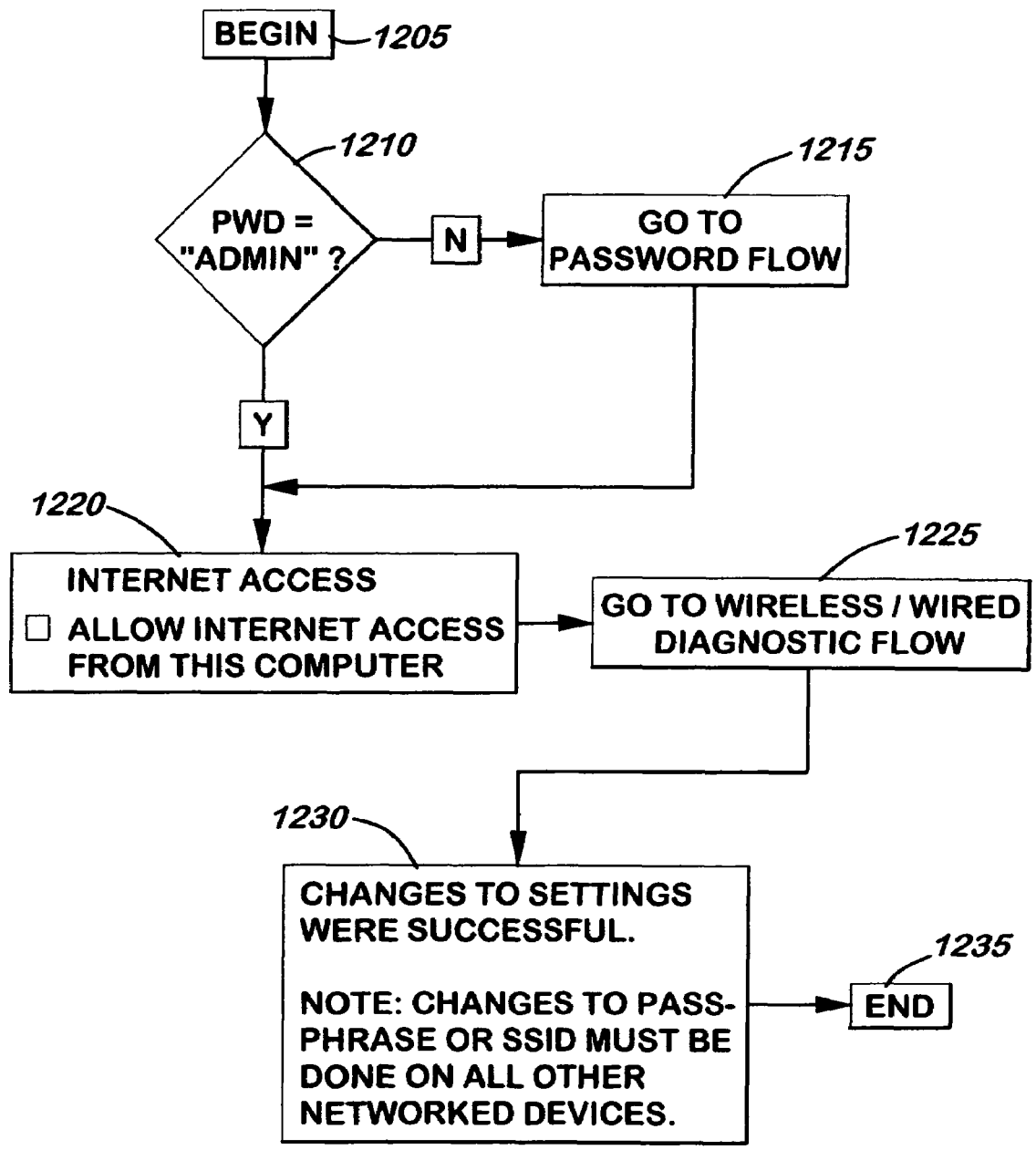
FIG. 12 illustrates a change internet access status flow of the present invention.

FIGS. 2A through 12 show in greater detail the steps of installing the setup wizards and the network console. In FIGS. 2A and 2B, a pre-wizard setup process is shown. In FIGS. 3A, 3B and 4, a client setup process is illustrated. FIGS. 5A and 5B illustrate a wireless/wired diagnostics flow. FIGS. 6A, 6B and 7 illustrate a thin RG setup flow. FIGS. 8, 9A and 9B illustrate a password flow. FIG. 10 illustrates an options menu flow. FIG. 11 illustrates a change file/print sharing flow and a configure wireless connection flow. FIG. 12 illustrates a change internet access status flow.

In FIG. 2 auto run 210 is begun. If the client PC has been set up 215, processing proceeds to the options menu 220. Otherwise, the wizard prepares the system by downloading necessary software and then guides installation of the home network 225. Then, the end user license agreement 230 is declined (i.e., ending processing) 235 or accepted. If the end user license agreement is accepted, the shield is installed 240. If a NIC is present 245, then a determination is made as to whether the internal NIC can see the RG 250. If it can, processing goes to step 285 of FIG. 3. Otherwise, a determination is made as to whether the external NA drivers are installed 255. If the external NA drivers are installed, processing proceeds to step 285 of FIG. 3. Otherwise, the wizard asks if an external NA is going to be attached to the PC 260. If no external NA is going to be attached, processing proceeds to step 290 of FIG. 3. Otherwise, processing proceeds to step 265. Step 265 is also reached if the is no NIC present in step 245. In step 265, the disk that came with the NA is inserted into the CD drive on the computer (the home network CD is removed as no longer needed). A determination is made as to whether the correct disk has been inserted 270. If it has not, the correct disk is inserted in to the computer 275. Otherwise, the NA drivers are downloaded 289 and processing proceeds to step 295.

In FIG. 3, if no external NA is to be attached to the PC (260), then a determination is made if an external NA is attached 305. If the external NA is attached, if the internal NIC sees the RG 250, or if the external NA drivers are installed 255, then processing proceeds to step 325 directly. Otherwise, the external NA is attached 310. A determination is made as to whether the drivers are installed and the NA attached 320. If not, then processing returns to step 310. Otherwise, the external NA is attached 315 and processing proceeds to step 325. In step 325, the user's wireless network pass phrase is obtained, if there is an SSID, processing proceeds to SSID step 340. If WEP encryption is to be performed, the SS ID is generated and an encryption key based upon the user's pass phrase is obtained and wireless configuration occurs 330. From steps 340 or 330, the computer names are entered 335, file and print sharing may be enabled 345, and Internet access may be permitted 350.

In FIG. 4, the installation progress 405 menu is displayed after step 350. The installation progress menu presents options for network, client, print sharing, and file sharing. Basic networking is configured 410 and a guide is provided for any error handling and troubleshooting 415. After step 405, a determination is made as to whether a reboot is required 410. If a reboot is required, then the system reboots 425. Processing proceeds to the wireless/wired diagnostics flow 430.

FIG. 5 illustrates a wireless/wired diagnostics flow 505. Initially, the connection to the thin RG is tested 510. The wireless/wired diagnostics includes programming on both the client side and the RG side with wireless/encryption settings and sets up the RG only if the client is not wireless 515. If the ping to the RG is not okay 520, a determination is made as to whether the client is wireless 525. If it is, the power RG is on and a retry is attempted 510 or the pass phrase is reentered 530 and processing proceeds to the pass phrase flow 540 or ends 545. If there is no wireless client 525, the RG is powered on 535 and either a retry is attempted 510 or processing ends 545. If the ping to the RG is okay 520, a determination is made as to whether the client is wireless 550. If the client is wireless 550, then a wireless connection is made to the RG 555 and tips are provided for improving the connection. A retry results in returning to processing step 510. Otherwise, a determination is made if the password is administrative 560. If the password is not administrative, processing goes to the password flow 565. Otherwise, Internet blocking is set 570, network diagnostics are completed 575, and processing proceeds to the thin RG setup flow 580.

In FIG. 6, the thin RG setup flow begins 605. A connection is made to the RG 610. If a determination is made that the password is administrative 615, processing proceeds to password flow 620. In either case, the next step is a determination as to whether there has been a launching by the console 625. If there has been a console launching, processing proceeds directly to step 645. Otherwise, a determination is made as to whether the RG was set up by the setup wizard 630. If the RG was set up by the setup wizard, the setup application is rerun 635 and processing ends 640. Otherwise, a determination is made if the password is administrative 645. If the password is administrative, the wizard helps set up the RG 650. The user is then provided with the opportunity to set the password 665, 660. If the password is not administrative 645, the wizard helps set up the password 655, 660, and processing proceeds to step 705. In FIG. 7, a selection is made as to whether the Internet connection is DSL or cable 705. If the Internet connection is DSL, then a determination is made for PPPOE 710. For an affirmative to PPPOE, the user name and password is entered 715; for the negative, the host name and domain name are entered 720. For cable, the host or PC name and domain name are entered 725. A determination is made as to whether additional information is required 730. If the ISP requires additional information, the additional information (i.e. IP address, subnet mask, default gateway address, DNS 1-3, and MAC address) 735, 740 is provided. The RG is wirelessly configured, pinged to verify that the RG is working, and the home network console is updated 745. The installation progresses 750. A successful installation results and tips are provided for printer usage, if applicable, 755, 760.

FIGS. 8 and 9 illustrate the password flow 660, 805. If the password is administrative 810, then processing proceeds to step 850. If the password is not administrative 810, the password is created 815. If the password is not of a valid form 820, the password is indicated as not having a valid form 825 and processing returns to step 815. Otherwise, a comparison is made of the password fields 830. If the password fields do not match, processing returns to step 815. Otherwise, the current password is saved for the next password lookup 840 and processing ends 845. If, in step 850, there is a saved password, if the password is confirmed 855, processing ends. Otherwise processing proceeds to step 905 where the password change is entered. If the password is confirmed, 910, the current password is saved for the next password lookup 970 and processing ends 975. Otherwise, the indication that the password is not correct is found in the message box overlay 915 and processing returns to step 905. When the password is changed 905, the old password, the new password, and confirmation of the new password are entered 920. If the old password is valid 925, a determination is made as to whether the password fields are both blank 935. If both password fields are blank 935, the password is result to a default and the system acts as if no password had ever been set 940 and processing proceeds to step 970. If both password fields are not blank 935, a determination is made as to whether the password has a valid form 945. If the password does not have a valid form 945, then a message box overlay indicates that the new password does not have a valid form 950 and processing proceeds to step 920. If the password does have a valid form 945, a determination is made as to whether the new password fields match 955. If the new password fields match, a new password is set 965 and processing proceeds to step 970. Otherwise, a message box overlay indicates that the new password fields did not match 960 and processing proceeds to step 920.

FIG. 10 illustrates an options menu flow 1005. Two options presented are configuring/reconfiguring the device and uninstalling the device 1010. Selecting the uninstalling a device option results in the uninstalling of the device in step 1015. Selecting the configuring/reconfiguring option results in a menu permitting the setup of the thin RG, rerunning the client setup, changing the file/print sharing status, configuring the wireless connection, and changing the Internet access status 1020. The user's selection is run 1030. Step 1035 confirms that the actions were successfully completed and processing ends 1040.

FIG. 11A illustrates a change file/ print sharing status flow 1105. The file sharing and/or the print sharing may be enabled 1110. Step 1115 indicates that the changes to the settings were successful. Changes to pass-phrase or SSID must be done on all other networked devices 1115 and processing ends 1120. FIG. 11B illustrates a configure wireless connection flow 1150. When a wireless pass-phrase is entered 1155, processing proceeds to the wireless/wired diagnostics flow 1165. If there is a manual SSLD entry, the SSTD/advanced is changed 1160 before proceeding to the wireless/wired diagnostic flow 1165. Successful changes to the settings are indicated 1170. Changes to pass-phrase or SSID must be done on all other networked devices 1170. Processing ends 1175.

FIG. 12 illustrates a change Internet access status flow. This change Internet access status flow is not supported by Intel RGs. If the password is not administrative 1210, processing proceeds to the password flow 1215 first. Internet access may be enabled 1220. Then processing proceeds to the wireless/wired diagnostic flow 1225. Successful changes to the settings are indicated 1230. Changes to pass-phrase or SSID must be done on all other networked devices 1230.

It is believed that the method of client-centered WEP settings on a LAN of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of changing configurations for a computer network, comprising:
   programming a residential gateway or access point;
   programming a client network adapter which corresponds to the residential gateway or access point, and
   checking, after the client network adapter is programmed, that a connection to the client network adapter and a connection to the residential gateway or access point has been maintained;
   wherein setting up of the client network adapter and setting up of the residential gateway or access point is performed through a single software program;

wherein the residential gateway or access point is programmed first and the client network adapter is programmed after the residential gateway or access point programming is completed; and wherein the method is performed wirelessly.

2. The method of claim 1, further comprising:
first reprogramming the residential gateway or access point, and upon completion of the first reprogramming, then reprogramming the client network adapter.

3. The method of claim 1, further comprising the client network adapter first trying to match an out-of box default of the residential gateway or access point.

4. The method of claim 1, further comprising:
accepting entry of a user pass phrase; and
generating a service set identifier (SSID) and an encryption key based upon the user pass phrase.

5. The method of claim 1, further comprising:
pinging the residential gateway to verify proper operation.

6. A method of changing configurations for a computer network, comprising:
programming a residential gateway or access point;
programming a client network adapter which corresponds to the residential gateway or access point, and
checking, after the client network adapter is programmed, that a connection to the client network adapter and a connection to the residential gateway or access point has been maintained;
wherein setting up of the client network adapter and setting up of the residential gateway or access point is performed through a single software program; and
wherein, if an encryption key is provided before the residential gateway or access point has been programmed, further comprising configuring the client network adapter to match an out-of-box default of the residential gateway or access point.

7. The method of claim 6, further comprising first reprogramming the residential gateway or access point and, upon completion of the first reprogramming, then reprogramming the client network adapter.

8. A method of changing configurations for a computer network, comprising:
programming a residential gateway or access point;
programming a client network adapter which corresponds to the residential gateway or access point, and
checking, after the client network adapter is programmed, that a connection to the client network adapter and a connection to the residential gateway or access point has been maintained;
wherein setting up of the client network adapter and setting up of the residential gateway or access point is performed through a single software program; and
wherein, if the residential gateway has already been programmed, then typing in the encryption information.

9. The method of claim 8, further comprising the client network adapter first trying to match an out-of-box default of the residential gateway or access point.

10. A program of instructions stored on a medium readable by an information handling system to seamlessly setup a network connection, the steps comprising:
code for setting up a residential gateway or access point;
code for setting up a client network adapter which corresponds to the residential gateway or access point, and
code for checking, after the client network adapter is programmed, that a connection to the client network adapter and a connection to the residential gateway or access point has been maintained;
wherein the code for setting up the residential gateway or access point and the code for setting up the client network adapter is a single integrated program;
wherein the residential gateway or access point is programmed first and the client network adapter is programmed after the residential gateway or access point programming is completed; and
wherein the method is performed wirelessly.

11. The computer program of claim 10, if an encryption key is provided before the residential gateway or access point has been programmed, further comprising configuring the client network adapter to match an out-of-box default of the residential gateway or access point.

12. The computer program of claim 11, further comprising first reprogramming the residential gateway or access point and, upon completion of the first reprogramming, then reprogramming the client network adapter.

13. The computer program of claim 10, further comprising:
code for accepting entry of a user pass phrase; and
code for generating a service set identifier (SSID) and an encryption key based upon the user pass phrase.

14. The computer program of claim 10, further comprising:
code for pinging the residential gateway to verify proper operation.

15. A program of instructions stored on a medium readable by an information handling system to seamlessly setup a network connection, the steps comprising:
code for setting up a residential gateway or access point;
code for setting up a client network adapter which corresponds to the residential gateway or access point, and
code for checking, after the client network adapter is programmed, that a connection to the client network adapter and a connection to the residential gateway or access point has been maintained;
wherein the code for setting up the residential gateway or access point and the code for setting up the client network adapter is a single integrated program;
wherein, if the residential gateway has already been programmed, then typing in the encryption information.

16. The computer program of claim 15, further comprising the client network adapter first trying to match an out-of-box default of the residential gateway or access point.

17. A program of instructions stored on a medium readable by an information handling system to seamlessly setup a network connection, the steps comprising:
code for setting up a residential gateway or access point;
code for setting up a client network adapter which corresponds to the residential gateway or access point, and
code for checking, after the client network adapter is programmed, that a connection to the client network adapter and a connection to the residential gateway or access point has been maintained;
wherein the code for setting up the residential gateway or access point and the code for setting up the client network adapter is a single integrated program;
wherein a user does not need to keep track of terminology or encryption settings.

* * * * *